Figure 1:
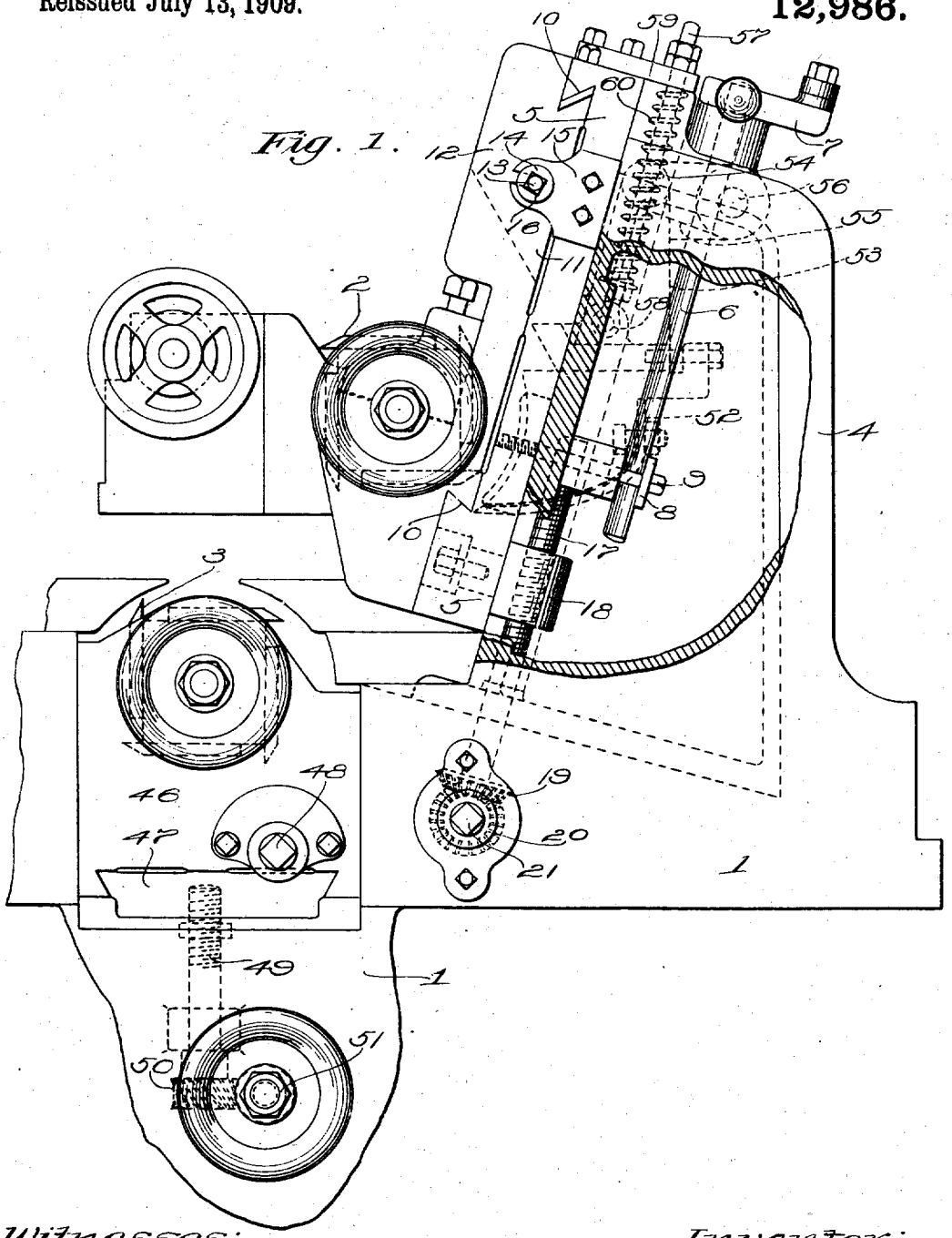

C. W. H. BLOOD.

WOOD PLANER FOR NARROW WORK.

APPLICATION FILED JUNE 5, 1909. 3 SHEETS—SHEET 1.

Reissued July 13, 1909. 12,986.

Witnesses:
M. J. Spalding
Edward Macwell

Inventor:
Charles W. H. Blood.
by Geo. H. Maxwell,
Atty.

ANDREW, R. GRAHAM CO., PHOTO-LITHOGRAPHERS, WASHINGTON, D. C.

C. W. H. BLOOD.

WOOD PLANER FOR NARROW WORK.

APPLICATION FILED JUNE 5, 1909.

3 SHEETS—SHEET 2.

Reissued July 13, 1909.

12,986.

Witnesses:
M. J. Spaeding
Edward Maxwell

Inventor:
Charles W. H. Blood.
by Geo. H. Maxwell,
Atty.

ANDREW. B. GRAHAM CO., PHOTO-LITHOGRAPHERS, WASHINGTON, D. C.

C. W. H. BLOOD.

WOOD PLANER FOR NARROW WORK.

APPLICATION FILED JUNE 5, 1909. 3 SHEETS—SHEET 3.

Reissued July 13, 1909.

12,986.

Witnesses:
M. J. Spalding
Edward Maxwell

Inventor:
Charles W. H. Blood.
by Geo. S. Maxwell, Atty.

ANDREW. B. GRAHAM CO., PHOTO-LITHOGRAPHERS, WASHINGTON, D. C.

UNITED STATES PATENT OFFICE.

CHARLES W. H. BLOOD, OF WINTHROP, MASSACHUSETTS, ASSIGNOR TO S. A. WOODS MACHINE COMPANY, OF BOSTON, MASSACHUSETTS.

WOOD-PLANER FOR NARROW WORK.

No. 12,986. Specification of Reissued Letters Patent. Reissued July 13, 1909.

Original No. 920,904, dated May 11, 1909, Serial No. 427,930. Application for reissue filed June 5, 1909. Serial No. 500,467.

*To all whom it may concern:*

Be it known that I, CHARLES W. H. BLOOD, a citizen of the United States, residing at Winthrop, in the county of Suffolk and State of Massachusetts, have invented an Improvement in Wood-Planers for Narrow Work, of which the following description, in connection with the accompanying drawings, is a specification, like numerals on the drawings representing like parts.

In planing narrow stock such as flooring, only a small portion of the cutterhead knives are ordinarily brought into use, and as the narrow stock is fed continuously and rapidly between the upper and lower cutterheads it gradually dulls and wears away this narrow portion or small extent of the cutter knives, so that in the ordinary construction it is necessary on this account to stop the machine and remove the cutterheads to renew or sharpen the knives at frequent intervals.

Accordingly my invention consists in providing the means hereinafter set forth whereby the cutterheads may be run on narrow stock without removal for a much longer time than heretofore, my invention enabling the knives to be renewed when still running.

I employ cutterheads having long straight knives, and provide means for longitudinally shifting the cutterhead while still running, so as to renew the cutting surface or bring a fresh cutting surface into operative position as the previous surface begins to get dull or worn. To this end I have made the cutterhead carrying means in two pieces, one provided with the necessary vertical adjustment for different thicknesses of stock and the other having a transverse adjustment for giving the cutterhead the longitudinal movement necessary in order to renew the cutting surface of the knives as stated. The adjusting means permits the lateral or longitudinal shifting of the cutterhead at any time while the machine is running, so as to present a fresh knife-surface to the work. To obtain the desired longitudinal movement without shifting the belt or pulley I provide a telescoping connection between the driving shaft and belt pulley, which permits the driving shaft to move longitudinally without changing the position of the belt pulley. Also I split or divide transversely the driving shaft and couple the two parts yieldingly so that the operator can uncouple the cutterhead and turn it around by hand for careful inspection when desired, and so that the efficiency of the machine may be increased by preventing the vibrations of the belt pulley being communicated to the cutterhead, inasmuch as it is a primary object of my invention to provide mechanism which will greatly increase the duration of time that the planer may be run without removing the cutterhead. To facilitate the longitudinal adjustment of my invention, the chip breaker is preferably mounted on the back portion of the head or standard and does not move transversely with the cutterhead, so that the latter has more free, delicate and accurate adjustment.

My invention includes further detailed improvements, all of which will be pointed out in the course of the following explanation of the more important features of the invention.

Figure 2:
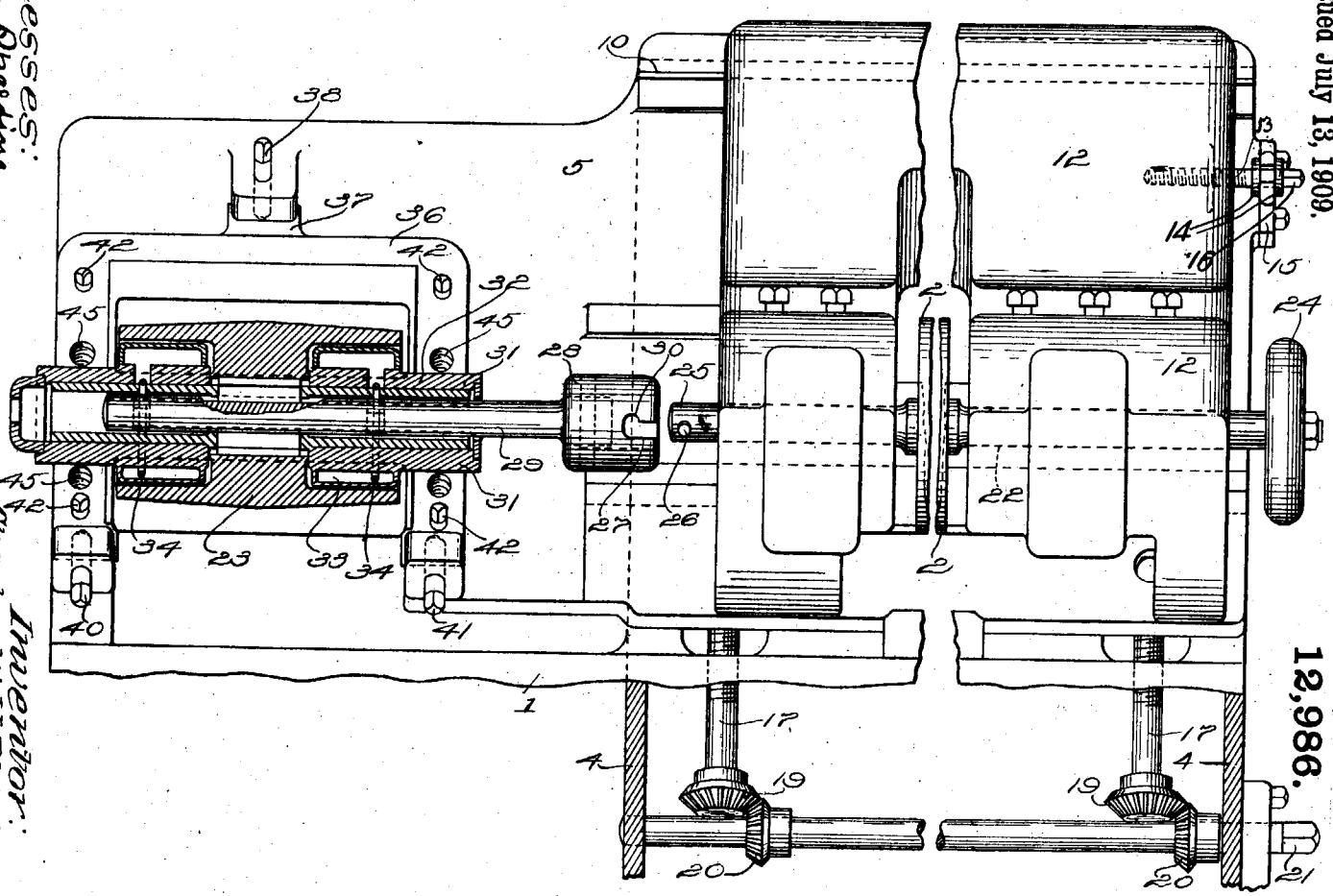
Figure 3:
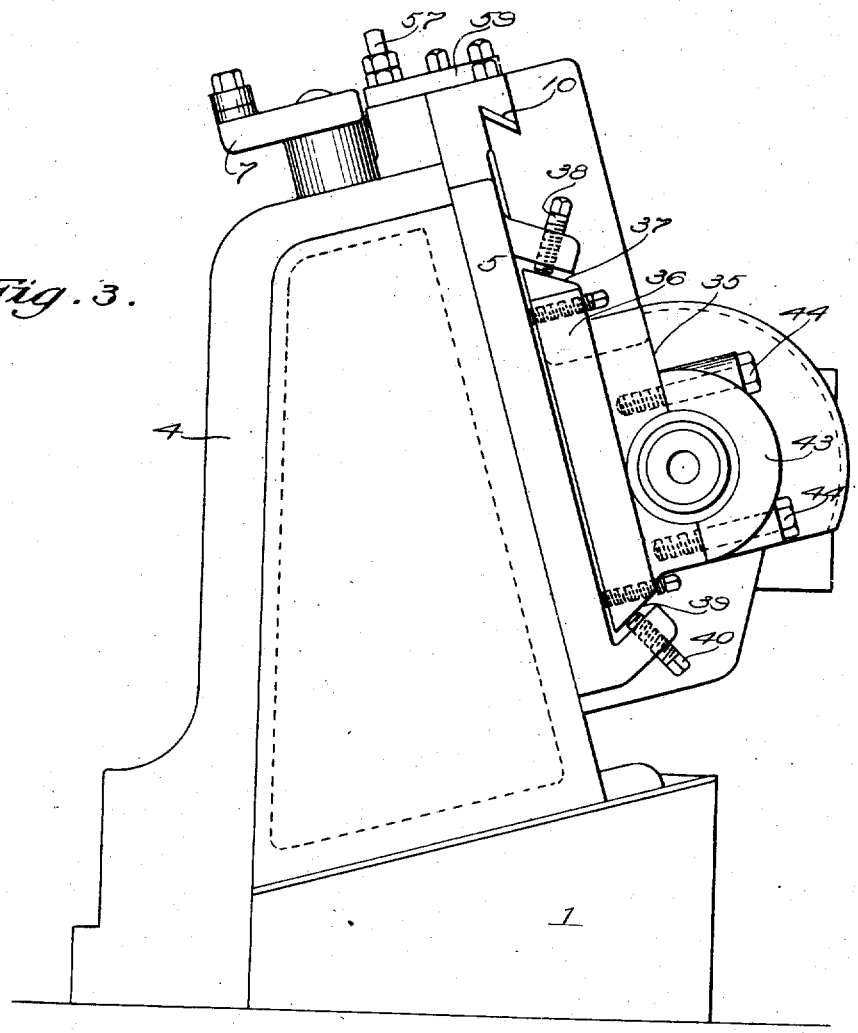

In the drawings, Figure 1 shows in end elevation a portion of a wood planer constructed according to my invention, parts being broken away for clearness of illustration; Fig. 2 is a front elevation thereof, partly broken away and sectioned; and Fig. 3 is an end elevation of the upper portion of the head or standard provided for the upper cutterhead.

The bed 1 and the general construction of the planer may be of any usual or preferred kind. The upper cutterhead is indicated at 2 and the lower cutterhead at 3 and in the accompanying drawings it will be understood that many of the accessories and constructional details are omitted. In the head or standard 4 provided for the upper cutterhead I mount a vertically sliding plate or supporting member 5 normally clamped adjacent each end by a locking rod 6 actuated by a crank 7 to tighten a strap 8 and holding bolt 9 secured in the back of the supporting member 5. The face of the latter has undercut ways 10 which provide a dove-tailed groove for receiving a correspondingly shaped back portion 11 of a front carrier plate 12 in which the cutterhead 2 is mounted. This dove-tailed arrangement or slide mounting of the carrier plate 12 provides a transverse or longitudinal movement for the cutterhead 2. This longitudinal movement may be effected in various ways but preferably I provide a bolt 13 having shoulders 14 at its outer end for maintaining it against longitudinal movement in a bracket 15 bolted to the plate 5, see Figs. 1 and 2, and provided with any suitable means for permitting it to be turned, being herein shown as having a square head 16.

The supporting plate 5 may be adjusted up and down by any suitable means, that herein shown consisting of upwardly extending threaded rods 17 engaging heavy fixed nuts or sleeves 18 at the back of the plate 5 and provided with beveled gears 19 at their lower ends engaging corresponding gears 20 on a horizontal shaft whose outer end 21 is arranged to be engaged by a crank or wrench for accomplishing the desired turning for said vertical adjustment.

The cutterhead is secured or carried in usual manner on a shaft 22 driven by a belt pulley 23 said shaft being journaled in the cutterhead carrier 12 and preferably provided at its outer end with a hand wheel 24. The shaft 22 instead of extending directly to the pulley 23, terminates at 25 where it is provided with a pin 26 to enter a slot 27 in a coupling 28 fast on a shaft 29, an offset 30 being preferably provided for interlocking somewhat with said pin 26. The shaft 29 has telescoping keyed connection with a hollow portion or sleeve 31, to which the pulley 23 is made fast, a wear plate or lining 32 being preferably interposed and the drawing showing oiling cavities 33 and oil delivering rings 34. By having the driving shaft thus arranged it is evident that the cutterhead may be slid longitudinally back and forth without requiring any change of position or adjustment of the driving pulley, thereby permitting the latter to be mounted in unchanging position as required for high speed movement. The dividing of the driving shaft into two parts coupled together as explained, prevents the transmission to the cutterhead of any possible vibration which the driving pulley may have. It is vitally essential, for the proper running of the cutterhead, that the driving pulley and its connections with the cutterhead shall be true and stable, and accordingly, besides the constructional details already explained, I provide the supporting yoke 35 of said pulley with a 3-point support, the back 36 of said yoke being herein shown as having its upper beveled edge 37 centrally engaged by a set bolt 38 and its beveled lower edge or edges 39 engaged at the opposite bottom corners by set bolts 40, 41. Also preferably bolts 42 are provided at the opposite upper and lower ends for bearing against the back plate 5. Thus by adjusting the bolts 40, 41 the driving pulley and its journal yoke may be tilted on the top bolt 38 as a pivot so as to true it with the axis of the cutterhead, and by turning the bolt 38 in one direction and the bolts 40, 41 in an opposite direction, said pulley and journal box may be adjusted up or down in parallelism to itself, and by means of the bolts 42 the pulley and its journal yoke may be moved in and out either in parallelism to itself or angularly, as may be desired. The journal box itself may be of any construction preferred, being herein shown as having a cap portion 43 fitting on the back portion 36 secured by bolts 44 entering holes 45. The lower cutterhead is also provided with the same movements as the upper cutterhead, being mounted in a block 46 having longitudinally sliding dovetailed engagement with a bed block 47 on which it is moved by a bolt 48 the same as the bolt 13 moves the upper block, said block 47 being raised vertically by bolts 49 provided with worms 50 engaging a shaft 51.

A usual chip breaker 52 is carried by the stationary standard 4, having at each end a bracket 53 pivoted at 54 to an arm 55 pivoted at 56 on said standard, said chip breaker being adjusted at each end by a bolt 57 pivoted at 58 thereto and normally held down in adjusted engagement with an arm 59 by a coiled spring 60 projecting rearwardly from the vertically movable plate 5 so as to move upward or downward with said plate when the cutter head and its driving means are adjusted by the screws 17.

In use, let it be supposed that usual narrow flooring is being planed, so that only a small narrow portion of the cutterhead knives is used, which would ordinarily require a frequent stopping of the machine to regrind or renew the knives. In my construction as soon as the operator sees that the cutterheads are getting dull or worn at the narrow place where they engage the stock, he simply turns the adjusting bolt 13 so as to slide the cutterhead along longitudinally sufficiently to bring a new cutting surface into engagement with the stock. Likewise he similarly adjusts the lower cutterhead by means of the similar adjusting bolt 48. He accomplishes this without stopping the machine in the slightest, and repeats the operation as often as the knives get dull, until the cutterhead has been traversed through its entire range of longitudinal movement.

My invention enables the operator to run the machine at high speed without interruption, inasmuch as he can readily renew the knives *i. e.*, can readily bring a new cutting surface into operative position, both for the upper and the lower cutterheads, without stopping the machine. On the other hand, if he wishes to examine the upper cutterhead, he simply disconnects or uncouples it from the driving shaft and can then examine it and handle it with impunity as it is impossible that by any accident the starting of the machine should start the cutterhead. The chip breaker being mounted on the stationary back head does not move laterally or transversely with the upper cutterhead. This enables me to get a more delicate and accurate adjustment of the latter than would be the case if it was weighted down with all of these adjacent parts, and furthermore it simplifies the mechanism.

Having described my invention, what I claim as new and desire to secure by Letters Patent of the United States is, 1. In a planing machine, a standard, an upper horizontal cutterhead adjustable thereon, a chip breaker carried by said standard independently of the cutterhead, driving means for rotating said cutterhead, means to raise and lower said cutterhead, driving means and chip breaker together, and means to move said cutterhead longitudinally independently of said chip breaker without stopping the machine.

2. In a planing machine, a supporting head extending across the machine, a broad flat supporting plate also extending across the machine mounted flat upon the front face of said head to move up and down thereon, operating means for moving said plate up and down on said head, a broad flat cutterhead carrier extending across the machine and mounted flat upon said plate to move transversely thereon, a cutterhead journaled in said carrier, a pulley supporting yoke adjustably mounted flat upon said plate, a driving pulley carried by said yoke, driving connections from said pulley to said cutterhead, and adjusting means for moving said carrier and its cutterhead toward and from said driving pulley.

3. In a planing machine, a cutterhead, a driving pulley therefor, a transversely divided shaft connecting said pulley and cutterhead, a loose coupling detachably retaining together the parts of said divided shaft for endwise movement in opposite directions, a supporting yoke for said pulley, and adjusting means for moving the yoke bodily upward and for rocking it endwise to bring the yoke and pulley into alinement with the cutterhead.

4. In a planing machine, a cutterhead, a driving pulley therefor, a transversely divided shaft connecting said pulley and cutterhead, a loose coupling detachably joining the parts of said divided shaft, a yoke for said pulley, and a three-point support for said yoke having one supporting point at one side of said yoke and two separated supporting points at the opposite side thereof, said three points each including independent adjusting means.

In testimony whereof, I have signed my name to this specification, in the presence of two subscribing witnesses.

CHARLES W. H. BLOOD.

Witnesses:
SAMUEL H. VORSMER,
WILLIAM J. PIKE.